United States Patent
Ganireddy et al.

(10) Patent No.: US 10,826,297 B2
(45) Date of Patent: Nov. 3, 2020

(54) SYSTEM AND METHOD FOR WIND POWER GENERATION AND TRANSMISSION IN ELECTRICAL POWER SYSTEMS

(71) Applicant: General Electric Company, Schenectady, NY (US)

(72) Inventors: Govardhan Ganireddy, Salem, VA (US); Biao Fang, Clifton Park, NY (US); Rajni Kant Burra, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/181,828

(22) Filed: Nov. 6, 2018

(65) Prior Publication Data

US 2020/0144826 A1    May 7, 2020

(51) Int. Cl.
| | |
|---|---|
| *H02J 3/38* | (2006.01) |
| *F03D 80/60* | (2016.01) |
| *F03D 80/80* | (2016.01) |
| *F03D 9/25* | (2016.01) |
| *H02K 7/18* | (2006.01) |
| *H01F 27/08* | (2006.01) |
| *H02M 5/42* | (2006.01) |

(52) U.S. Cl.
CPC .............. *H02J 3/386* (2013.01); *F03D 9/257* (2017.02); *F03D 80/60* (2016.05); *F03D 80/85* (2016.05); *H01F 27/08* (2013.01); *H02K 7/183* (2013.01); *H02M 5/42* (2013.01); *F05B 2240/96* (2013.01)

(58) Field of Classification Search
CPC ........... H02J 3/386; F03D 9/257; H02K 7/183
USPC .................................. 290/44, 55; 700/287
See application file for complete search history.

(56) References Cited

U.S. PATENT DOCUMENTS

| | | | | |
|---|---|---|---|---|
| 4,349,801 A | * | 9/1982 | Altmann | ............... H01F 27/022 336/107 |
| 4,488,134 A | * | 12/1984 | Pfeiffer | ................... H01F 27/20 336/196 |

(Continued)

FOREIGN PATENT DOCUMENTS

| | | |
|---|---|---|
| EP | 2 590 304 A2 | 5/2013 |
| EP | 3 312 856 A1 | 4/2018 |
| ES | 2 312 280 A1 | 2/2009 |

OTHER PUBLICATIONS

European Search Report, dated Mar. 10, 2020 for EP Application No. 19207456.5.

*Primary Examiner* — Pedro J Cuevas
(74) *Attorney, Agent, or Firm* — Dority & Manning, P.A.

(57) ABSTRACT

Systems and methods of wind power generation in electrical power systems are described. According to one aspect, a wind turbine system can include a down tower portion having a main transformer configured to transform medium voltage power to another voltage power, a tower portion having one or more medium voltage cables configured to transmit medium voltage power, and, a nacelle portion. The nacelle portion can include a generator comprising a stator and a rotor. The stator may be connected to one or more medium voltage cables via a stator power path. The nacelle portion also includes a power converter coupled to the rotor of the generator, and, a step-up transformer coupled to the power converter and the one or more medium voltage cables. The step-up transformer can be configured to step-up low voltage power to medium voltage power.

19 Claims, 6 Drawing Sheets

(56) References Cited

U.S. PATENT DOCUMENTS

| | | | | |
|---|---|---|---|---|
| 5,267,393 A * | 12/1993 | Purohit | H01F 27/322 | 29/605 |
| 5,383,266 A * | 1/1995 | Soter | H01F 27/263 | 29/606 |
| 5,396,210 A * | 3/1995 | Purohit | H01F 27/263 | 336/196 |
| 5,461,772 A * | 10/1995 | Puri | H01F 27/327 | 29/605 |
| 5,596,305 A * | 1/1997 | Puri | H01F 27/327 | 336/205 |
| 5,621,372 A * | 4/1997 | Purohit | H01F 27/263 | 336/196 |
| 6,147,580 A * | 11/2000 | Rettew | H01F 27/327 | 336/205 |
| 6,157,282 A * | 12/2000 | Hopkinson | H01F 27/10 | 336/57 |
| 6,368,530 B1 * | 4/2002 | Adubato | F28D 7/024 | 264/154 |
| 6,479,907 B1 * | 11/2002 | Eriksson | F03D 9/257 | 290/44 |
| 7,119,452 B2 * | 10/2006 | Larsen | F03D 9/257 | 290/55 |
| 7,652,387 B2 * | 1/2010 | Corcelles Pereira | H02J 3/18 | 290/44 |
| 7,679,215 B2 * | 3/2010 | Delmerico | F03D 7/0284 | 290/55 |
| 7,830,127 B2 * | 11/2010 | Corcelles Pereira | H02J 3/1807 | 322/24 |
| 7,839,024 B2 * | 11/2010 | Cardinal | F03D 7/0284 | 307/84 |
| 7,880,335 B2 * | 2/2011 | Altenschulte | H01B 7/14 | 307/68 |
| 8,041,465 B2 * | 10/2011 | Larsen | H02J 3/16 | 700/287 |
| 8,085,121 B2 * | 12/2011 | Hanov | H01F 27/362 | 336/84 C |
| 8,111,123 B2 * | 2/2012 | Lim | H01F 41/127 | 336/55 |
| 8,269,590 B2 * | 9/2012 | Bjerknes | H01R 13/005 | 336/130 |
| 8,274,350 B2 * | 9/2012 | Hanov | H01F 27/085 | 336/59 |
| 8,290,634 B2 * | 10/2012 | Larsen | H02J 3/16 | 700/287 |
| 8,643,458 B2 * | 2/2014 | Hanov | H01F 27/2847 | 336/198 |
| 8,669,669 B1 * | 3/2014 | Wagoner | H02P 9/007 | 290/44 |
| 8,716,878 B2 * | 5/2014 | Matsunobu | F03D 1/06 | 290/44 |
| 8,823,192 B2 * | 9/2014 | Bech | H02J 3/381 | 290/44 |
| 8,880,228 B2 * | 11/2014 | Kumar | H02J 3/26 | 700/286 |
| 8,912,675 B2 * | 12/2014 | Mata Dumenjo | H02J 3/1842 | 290/44 |
| 8,975,768 B2 * | 3/2015 | Wagoner | H02P 3/22 | 290/44 |
| 9,018,783 B2 * | 4/2015 | Cooper | H02J 3/386 | 290/44 |
| 9,039,368 B2 * | 5/2015 | Sivalingam | F03D 80/30 | 416/95 |
| 9,046,077 B2 * | 6/2015 | Kirchner | F03D 7/0284 | |
| 9,203,333 B2 * | 12/2015 | Larsen | F03D 7/00 | |
| 9,291,152 B2 * | 3/2016 | Gupta | F03D 9/255 | |
| 9,318,988 B2 * | 4/2016 | Larsen | H02P 9/04 | |
| 9,537,437 B2 * | 1/2017 | Wagoner | H02J 3/386 | |
| 9,677,544 B2 * | 6/2017 | Li | F03D 7/048 | |
| 9,679,691 B2 * | 6/2017 | Gaard | H01F 27/14 | |
| 9,702,908 B2 * | 7/2017 | Gupta | F03D 7/042 | |
| 9,911,528 B2 | 3/2018 | Hillebrandt et al. | | |
| 9,941,687 B2 * | 4/2018 | Zhu | F03D 7/0244 | |
| 10,050,447 B2 * | 8/2018 | Burra | F03D 7/048 | |
| 10,184,985 B2 * | 1/2019 | Grubic | G01R 31/34 | |
| 10,186,996 B1 * | 1/2019 | Holliday | H02P 9/007 | |
| 10,352,298 B2 * | 7/2019 | Tan | H02P 9/007 | |
| 10,361,024 B2 * | 7/2019 | Hanov | H01F 27/24 | |
| 10,519,933 B2 * | 12/2019 | Dharmadhikari | H02J 3/32 | |
| 10,523,088 B2 * | 12/2019 | Dharmadhikari | H02K 7/183 | |
| 10,570,882 B2 * | 2/2020 | Hardwicke, Jr. | F03D 7/028 | |
| 10,615,608 B2 * | 4/2020 | Shukla | F03D 9/257 | |
| 10,630,215 B2 * | 4/2020 | Wagoner | H02M 5/4585 | |
| 10,637,248 B2 * | 4/2020 | Letas | F03D 80/85 | |
| 2005/0046196 A1 * | 3/2005 | Larsen | F03D 9/257 | 290/44 |
| 2006/0255594 A1 * | 11/2006 | Larsen | F03D 9/257 | 290/44 |
| 2008/0150285 A1 * | 6/2008 | Corcelles Pereira | H02J 3/1807 | 290/44 |
| 2008/0157530 A1 * | 7/2008 | Corcelles Pereira | H02J 3/18 | 290/44 |
| 2008/0211611 A1 * | 9/2008 | Hanov | H01F 27/362 | 336/60 |
| 2009/0134625 A1 * | 5/2009 | Altenschulte | H01B 7/14 | 290/44 |
| 2010/0084865 A1 * | 4/2010 | Corcelles Pereira | H02J 3/18 | 290/44 |
| 2011/0018270 A1 * | 1/2011 | Corcelles Pereira | H02J 3/1807 | 290/44 |
| 2011/0050377 A1 * | 3/2011 | Bjerknes | H01F 38/18 | 336/120 |
| 2011/0063062 A1 * | 3/2011 | Lim | H01F 27/322 | 336/60 |
| 2011/0140430 A1 * | 6/2011 | Ritter | H02P 9/102 | 290/44 |
| 2011/0175696 A1 * | 7/2011 | Hanov | H01F 27/085 | 336/59 |
| 2011/0210812 A1 * | 9/2011 | Charwat | H01F 27/306 | 336/210 |
| 2012/0044035 A1 * | 2/2012 | Hanov | H01F 27/2847 | 336/220 |
| 2012/0057976 A1 * | 3/2012 | Matsunobu | F03D 1/06 | 416/1 |
| 2012/0063890 A1 * | 3/2012 | Sivalingam | F03D 80/30 | 415/177 |
| 2012/0136494 A1 * | 5/2012 | Kirchner | H02J 3/16 | 700/287 |
| 2013/0002211 A1 * | 1/2013 | Egedal | H02J 3/16 | 323/208 |
| 2013/0015660 A1 * | 1/2013 | Hesselbæk | H02J 3/16 | 290/44 |
| 2013/0128630 A1 * | 5/2013 | Jensen | H02J 3/36 | 363/35 |
| 2013/0173073 A1 * | 7/2013 | Breeze | F03D 7/0284 | 700/287 |
| 2013/0195653 A1 * | 8/2013 | Hayashi | F03D 7/0296 | 416/1 |
| 2013/0224013 A1 * | 8/2013 | De Broe | H01F 38/18 | 415/213.1 |
| 2013/0241201 A1 * | 9/2013 | Fortmann | H02J 3/26 | 290/44 |
| 2013/0264824 A1 * | 10/2013 | Gupta | H02K 7/183 | 290/44 |
| 2013/0270823 A1 * | 10/2013 | Hannon | F03D 7/0264 | 290/44 |
| 2013/0300116 A1 * | 11/2013 | Egedal | F03D 7/026 | 290/44 |
| 2013/0300118 A1 * | 11/2013 | Bech | F03D 9/257 | 290/44 |
| 2014/0062086 A1 * | 3/2014 | Mata Dumenjo | H02J 3/1842 | 290/44 |
| 2014/0070536 A1 * | 3/2014 | Wagoner | H02P 9/007 | 290/44 |
| 2014/0229153 A1 * | 8/2014 | Grastein | H02J 3/386 | 703/18 |
| 2014/0247021 A1 * | 9/2014 | Wagoner | H02P 9/007 | 322/47 |

(56) References Cited

U.S. PATENT DOCUMENTS

| | | | | |
|---|---|---|---|---|
| 2014/0252775 A1* | 9/2014 | Hillerbrandt | ............ | H01F 27/40 290/55 |
| 2014/0300108 A1* | 10/2014 | Sahukari | ................. | F03D 7/047 290/44 |
| 2014/0346774 A1* | 11/2014 | Cooper | ................... | H02J 3/386 290/44 |
| 2014/0361538 A1* | 12/2014 | Wagoner | ................... | H02P 3/22 290/44 |
| 2015/0021912 A1* | 1/2015 | Bech | ..................... | F03D 7/0276 290/44 |
| 2015/0070869 A1* | 3/2015 | Gaard | .................... | H01F 27/14 361/836 |
| 2015/0088326 A1* | 3/2015 | Fortmann | ............... | F03D 7/043 700/287 |
| 2015/0249414 A1* | 9/2015 | Barker | .................. | H02P 9/007 290/44 |
| 2015/0349687 A1* | 12/2015 | Liang | ........................ | H02J 3/38 322/61 |
| 2016/0049792 A1* | 2/2016 | Burra | ................. | G05B 19/0421 307/52 |
| 2016/0118786 A1* | 4/2016 | Zhu | ....................... | F03D 7/0244 290/44 |
| 2016/0231365 A1* | 8/2016 | Gupta | .................... | F03D 9/257 |
| 2017/0176536 A1* | 6/2017 | Grubic | ................... | G01R 31/34 |
| 2017/0271070 A1* | 9/2017 | Hanov | .................... | H01F 27/23 |
| 2018/0171976 A1* | 6/2018 | Tan | ....................... | F03D 7/0272 |
| 2018/0287369 A1* | 10/2018 | Letas | ...................... | F03D 9/255 |
| 2018/0294650 A1* | 10/2018 | Shukla | .................. | H02K 7/183 |
| 2018/0306169 A1* | 10/2018 | Dharmadhikari | ........ | H02J 11/00 |
| 2018/0309318 A1* | 10/2018 | Dharmadhikari | ......... | H02J 3/18 |
| 2018/0342968 A1* | 11/2018 | Holliday | ................ | H02P 9/007 |
| 2019/0072073 A1* | 3/2019 | Wagoner | .............. | F03D 7/0284 |
| 2019/0089145 A1* | 3/2019 | Holliday | ................ | H02M 5/42 |
| 2019/0140569 A1* | 5/2019 | Schnetzka | ............ | H02M 5/4585 |
| 2019/0145376 A1* | 5/2019 | Hardwicke, Jr. | ..... | F03D 7/0272 700/287 |
| 2019/0148949 A1* | 5/2019 | Biris | ...................... | H02P 9/007 290/44 |
| 2019/0203693 A1* | 7/2019 | Tiwari | ................... | F03D 17/00 |
| 2019/0234378 A1* | 8/2019 | Tan | ........................ | H02J 3/386 |
| 2019/0312502 A1* | 10/2019 | Ganireddy | ........... | H02M 1/126 |
| 2019/0369145 A1* | 12/2019 | Gupta | ....................... | F03D 7/00 |
| 2019/0376489 A1* | 12/2019 | Holliday | ................ | H02M 1/36 |
| 2019/0383864 A1* | 12/2019 | Joshi | ................... | H02J 13/0006 |
| 2020/0029395 A1* | 1/2020 | Wagoner | ............... | G01K 1/026 |
| 2020/0052493 A1* | 2/2020 | Kolhatkar | ............... | H02J 3/381 |
| 2020/0052629 A1* | 2/2020 | Baechle | ............... | F01D 15/10 |
| 2020/0076193 A1* | 3/2020 | Biris | ....................... | F03D 9/255 |
| 2020/0106295 A1* | 4/2020 | Trzemzalski | ........... | H02J 3/381 |

* cited by examiner

SYSTEM AND METHOD FOR WIND POWER GENERATION AND TRANSMISSION IN ELECTRICAL POWER SYSTEMS

FIELD

The present disclosure relates generally to electrical power systems, and more particular to wind turbine electrical power systems.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to a power grid via a grid breaker. Thus, the turbine transformer steps up the voltage amplitude of the electrical power such that the transformed electrical power may be further transmitted to the power grid.

In many wind turbines, the generator rotor may be electrically coupled to a bi-directional power converter that includes a rotor side converter joined to a line side converter via a regulated DC link. More specifically, some wind turbines, such as wind-driven doubly-fed induction generator (DFIG) systems or full power conversion systems, may include a power converter with an AC-DC-AC topology.

In such systems, the generator stator is separately connected to the power grid via a main transformer arranged up tower, or within the nacelle. However, main transformers in such systems can be large, bulky, and heavy. Due to these attributes, structural design of towers must take into consideration the additional weight of the main transformers, as well as costs. Furthermore, if the main transformer is situated in a nacelle portion of the wind turbine, additional consideration must be taken to ensure the nacelle can rotate effectively with such additional weight.

BRIEF DESCRIPTION

Aspects and advantages of the invention will be set forth in part in the following description, or may be obvious from the description, or may be learned through practice of the invention.

According to one aspect, a wind turbine system can include a down tower portion having a main transformer configured to transform medium voltage power to another voltage power, a tower portion having one or more medium voltage cables configured to transmit medium voltage power, and, a nacelle portion. The nacelle portion can include a generator comprising a stator and a rotor. The stator may be connected to one or more medium voltage cables via a stator power path. The nacelle portion also includes a power converter coupled to the rotor of the generator, and, a step-up transformer coupled to the power converter and the one or more medium voltage cables. The step-up transformer can be configured to step-up low voltage power received at the power converter from the rotor to medium voltage power for transmission via the one or more medium voltage cables.

According to an additional aspect, a method for distributing power in a wind turbine power system can include generating low voltage power at a rotor of a wind turbine generator and generating medium voltage power at a stator of the wind turbine generator. The method can also include converting, with a power converter, the low voltage power to an output low voltage AC power. Furthermore, the method can also include converting, with a step-up transformer, the low voltage power from the power converter to medium voltage power. Finally, the method can include transmitting, the medium voltage power, down a tower of the wind turbine generator via one or more medium voltage cables.

According to yet another aspect, a wind turbine electrical power system can include a central transformer configured to transform medium voltage power to high voltage power, and, a plurality of wind turbines in operative communication with the central transformer. Each wind turbine of the plurality of wind turbines can include a tower portion having one or more medium voltage cables configured to transmit medium voltage power, and, a nacelle portion having a generator. The generator can include a stator and a rotor, with the stator connected to one or more medium voltage cables via a stator power path. The nacelle portion can also include a power converter coupled to the rotor of the generator, and, a step-up transformer coupled to the power converter and the one or more medium voltage cables. The step-up transformer can be configured to step-up low voltage power received at the power converter from the rotor to medium voltage power for transmission via the one or more medium voltage cables.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for transmitting power in wind turbine systems. More specifically, example aspects of the present disclosure provide a system for transmitting power through a wind turbine tower that leads to reduced weight and complexity of tower design. For example, the power transmission may be provided through medium voltage lines of reduced weight as compared to large and bulky low voltage buses. Furthermore, bulky transformers may be absent from nacelles of the wind turbines, further reducing complexity in tower design.

In particular embodiments, wind turbine systems may include a step-up transformer to transform low voltage power to medium voltage power for transmission through a tower portion of the wind turbine system. Additionally, large, bulky main transformers are situated either in a down tower portion, or in a centralized location remote to the wind turbine, to further reduce weight with a negligible increase in power transmission losses. Further, the system and associated methods may be applied to any electrical power system, including but not limiting to wind conversion systems, solar conversions systems, energy storage systems, and combinations thereof.

Accordingly, the present disclosure has many technical effects and advantages. For example, the system and method of the present disclosure provides a higher system reliability (e.g. lower weight in nacelle rotation, etc.) as well as lower system cost (e.g. lower weight of components, lower cost of components, lower design costs, and/or lower maintenance costs).

Figure 1:
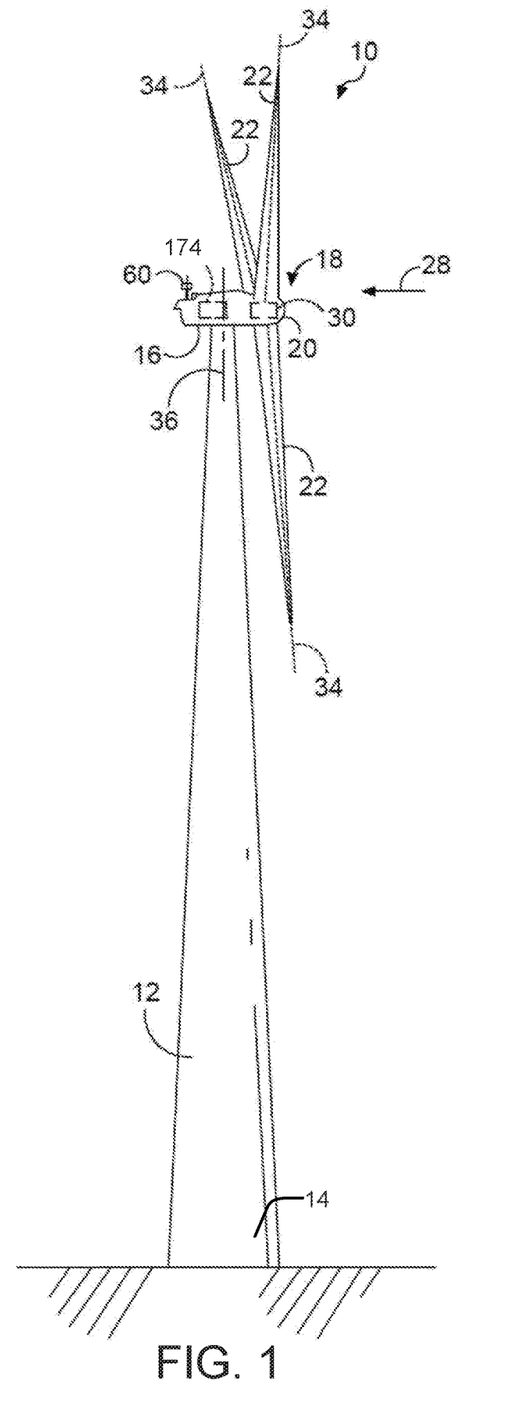
FIG. 1 is a perspective view of a wind turbine according to the present disclosure.

Referring now to the drawings, FIG. 1 illustrates a perspective view of one embodiment of a wind turbine 10. As shown, the wind turbine 10 includes a tower portion 12 extending from a down tower portion 14, a nacelle portion 16 mounted on the tower 12, and a rotor 18 coupled to the nacelle portion 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or fewer than three rotor blades 22. Each rotor blade 22 may be spaced about the hub 20 to facilitate rotating the rotor 18 to enable kinetic energy to be transferred from the wind into usable mechanical energy and, subsequently, electrical energy. For instance, the hub 20 may be rotatably coupled to an electric generator 120 of FIG. 2 positioned within the nacelle portion 16 to permit electrical energy to be produced. The wind turbine 10 may further include a turbine controller 174 utilized to control yaw adjustment of the wind turbine 10, pitch adjustment of the rotor blades 22, and/or torque adjustment of the generator 120 of FIG. 2.

Figure 2:
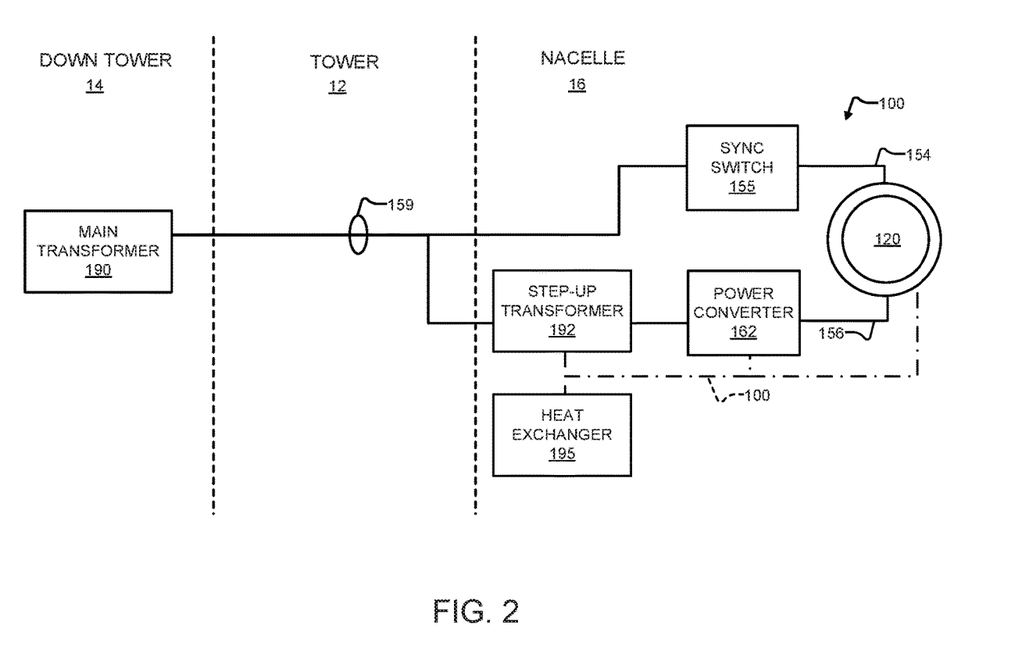
FIG. 2 illustrates a wind driven doubly-fed induction generator (DFIG) system, according to one embodiment of the present disclosure.

FIG. 2 illustrates a wind driven doubly-fed induction generator (DFIG) system 100, according to one embodiment of the present disclosure. Example aspects of the present disclosure are discussed with reference to the DFIG wind turbine system 100 of FIG. 2 and wind turbine 10 of FIG. 1 for purposes of illustration and discussion. Those of ordinary skill in the art, using the disclosures provided herein, should understand that example aspects of the present disclosure are also applicable in other power systems, such as a wind, solar, gas turbine, or other suitable power generation systems.

As illustrated, the DFIG system 100 comprises the generator 120 arranged within the nacelle portion 16. In accordance with aspects of the present disclosure, the generator 120 may be any suitable generator, including for example, a doubly fed induction generator (DFIG). The generator 120 is typically coupled to a stator bus 154 and a power converter 162 via a rotor bus 156. The stator bus 154 provides an output multiphase power (e.g. three-phase power) from a stator of the generator 120 and the rotor bus 156 provides an output multiphase power (e.g. three-phase power) of a rotor of the generator 120.

The stator bus 154 may be coupled to a synch switch 155. The synch switch 155 may switch the stator bus 154 and provide the three-phase power from the stator to a main transformer 190 over one or more medium voltage cables 159. The rotor bus 156 may be coupled to the power converter 162. Generally, the output of the power converter 162 may be a low voltage power. Accordingly, the low voltage power output may be fed to step-up transformer 192 to be stepped up to medium voltage power to be transmitted over the one or more medium voltage cables 159.

It is noted that according to one embodiment, the step-up transformer 192 may be embodied as a cast resin transformer with integrated cooling. However, a liquid-to-air heat exchanger 195 and liquid path 196 may also be integrated within the nacelle portion 16. In such an example, the liquid path 196 can be configured to cool at least one of the generator 120, the power converter 162, and the step-up transformer 192.

As shown, the synch switch 155, power converter 162, and step-up transformer 192 are arranged within the nacelle portion 16. Furthermore, the medium voltage cables 159 are arranged to extend from the nacelle portion 16, through the tower portion 12, and into the down tower portion 14. According to at least one embodiment, as the nacelle portion 16 turns about an axis defined by the tower portion 12, the medium voltage cables 159 may twist and turn to accommodate rotation of the nacelle portion 16.

As noted above, low voltage power is generated at the rotor bus 156 and converted by the power converter 162, while medium voltage power is provided at the stator bus 154. As used herein, low voltage power refers to power having a voltage of less than about 1 kilovolt. Additionally, as used herein, medium voltage power refers to power between about 1 to 13.8 kilovolts of voltage. Finally, as used herein, high voltage power refers to power having more than about 33 kilovolts of voltage.

Upon receipt of medium voltage power via the one or more medium voltage cables 159, the main transformer 190 may step-up and transform the medium voltage power to high voltage power, or another voltage power, for transmission on a power grid.

Figure 3:
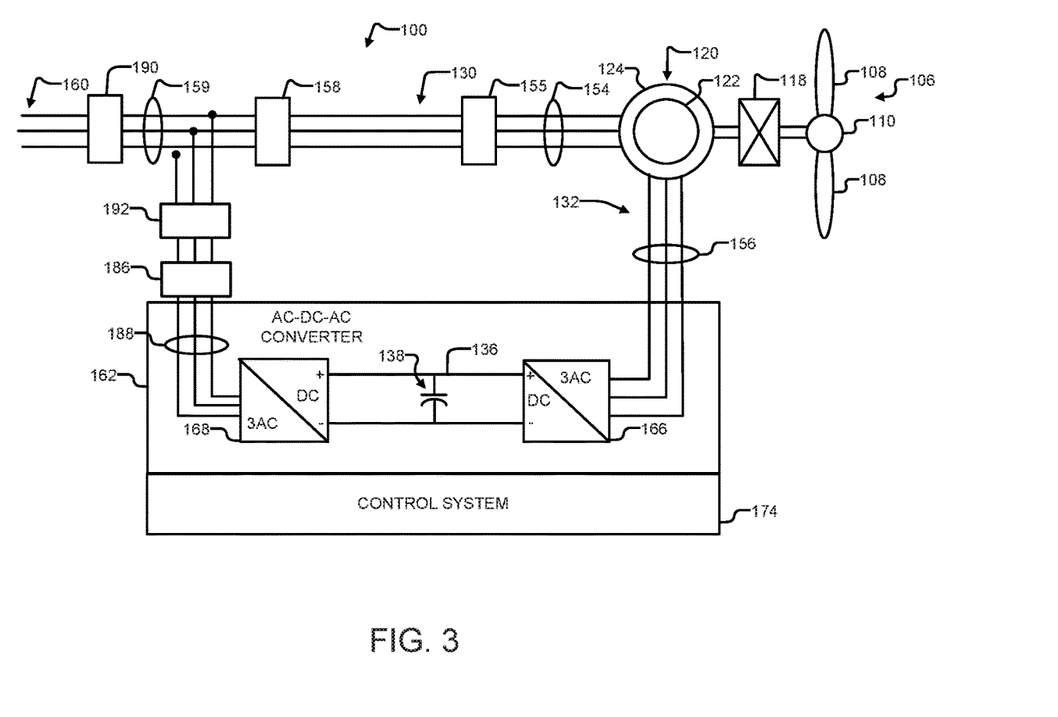
FIG. 3 illustrates a more detailed schematic of the DFIG system of FIG. 2.

FIG. 3 illustrates a more detailed schematic of the wind driven DFIG system 100 according to one embodiment of the present disclosure. In the system 100, a rotor 106 includes a plurality of rotor blades 108 coupled to a rotatable hub 110. The rotatable hub 110 is coupled to an optional gearbox 118, which is, in turn, coupled to a generator 120 having a rotor 122 and a stator 124. As described above, the generator 120 is typically coupled to a stator bus 154 and a power converter 162 via a rotor bus 156. The stator bus 154 provides an output multiphase power from a stator of the generator 120 and the rotor bus 156 provides an output multiphase power of a rotor of the generator 120.

The power converter 162 includes a rotor-side converter 166 coupled to a line-side converter 168. The DFIG 120 is coupled to the rotor-side converter 166 via the rotor bus 156. The line-side converter 168 is coupled to a line-side bus 188. Further, as shown, the stator bus 154 may be directly connected to the line-side bus 188. In example configurations, the rotor-side converter 166 and the line-side converter 168 are configured for normal operating mode in a three-phase, PWM arrangement using insulated gate bipolar transistor (IGBT) switching devices. The rotor-side converter 166 and the line-side converter 168 can be coupled via a DC link 136 across which is the DC link capacitor 138. As shown, the stator bus 154 and the power converter 162 (e.g., via the step-up transformer 192) may be connected to windings of the main transformer 190, i.e. at the junction of the generator breaker 158 and the step-up transformer 192.

Figure 4:
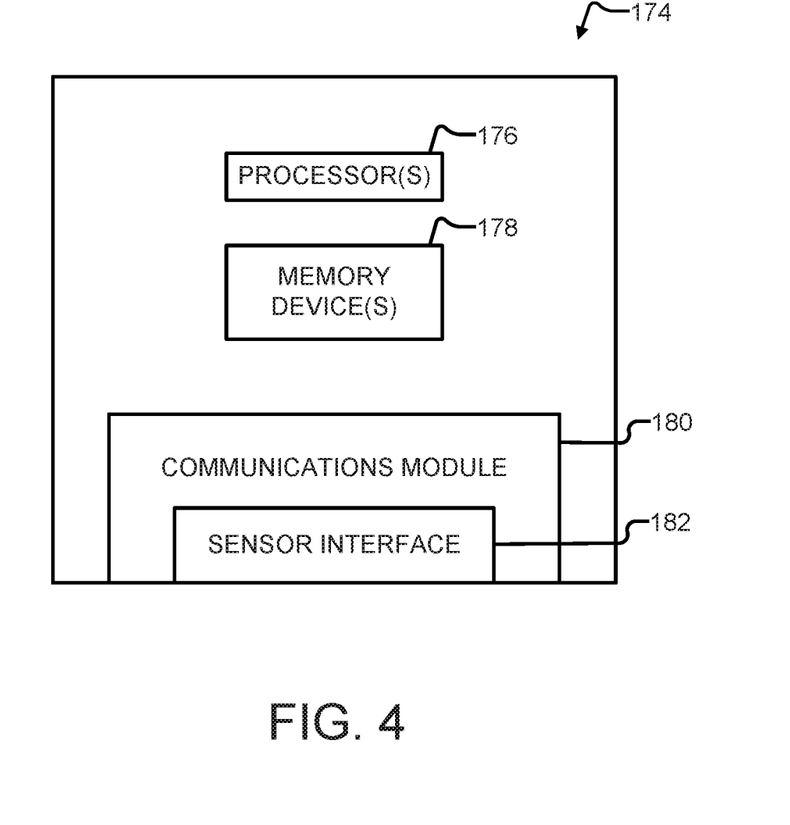
FIG. 4 illustrates a block diagram of one embodiment of a control system suitable for use with the DFIG system shown in FIG. 3.

The power converter 162 can be coupled to the control system 174 to control the operation of the rotor-side converter 166 and the line-side converter 168 and other aspects of the power system 100. For example, as shown particularly in FIG. 4, the control system 174 can include any number of control devices. In one implementation, for example, the control system 174 can include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands (e.g. pulse width modulation commands) to the switching devices of the power converter 162 and other aspects of the power system 100. Additionally, the control system 174 may also include a communications module 180 to facilitate communications between the control system 174 and the various components of the power system 100, e.g. any of the components of FIG. 1, FIG. 2, and FIG. 3. Further, the communications module 180 may include a sensor interface 182 (e.g., one or more analog-to-digital converters) to permit signals transmitted from one or more sensors to be converted into signals that can be understood and processed by the processors 176. It should be appreciated that the sensors may be communicatively coupled to the communications module 180 using any suitable means. For example, the sensors can be coupled to the sensor interface 182 via a wired connection. However, in other embodiments, the sensors may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the control system 174 to perform the various functions as described herein.

Turning back to FIG. 3, during operation, alternating current power generated at the DFIG 120 by rotation of the rotor 106 is provided via a dual path to an electrical grid 160. The dual paths are defined by a generator power path 130 and a converter power path 132. On the converter power path 132, sinusoidal multi-phase (e.g. three-phase) alternating current (AC) power is provided to the power converter 162 via the rotor bus 156.

The rotor-side power converter 166 converts the AC power provided from the rotor bus 156 into direct current (DC) power and provides the DC power to the DC link 136. Switching devices (e.g. IGBTs) used in bridge circuits of the rotor side power converter 166 can be modulated to convert the AC power provided from the rotor bus 156 into DC power suitable for the DC link 136.

The line-side converter 168 converts the DC power on the DC link 136 into AC output power of low voltage (e.g., less than about 1 kilovolt). In particular, switching devices (e.g. IGBTs) used in bridge circuits of the line-side power converter 168 can be modulated to convert the DC power on the DC link 136 into AC power on the line-side bus 188. The low voltage AC power from the power converter 162 can be stepped up to medium voltage power by the step-up transformer 192 and transmitted via the one or more medium voltage cables 159.

Various circuit breakers and switches, such as a generator breaker 158 and converter breaker 186, can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the control system 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the control system 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

Figure 5:
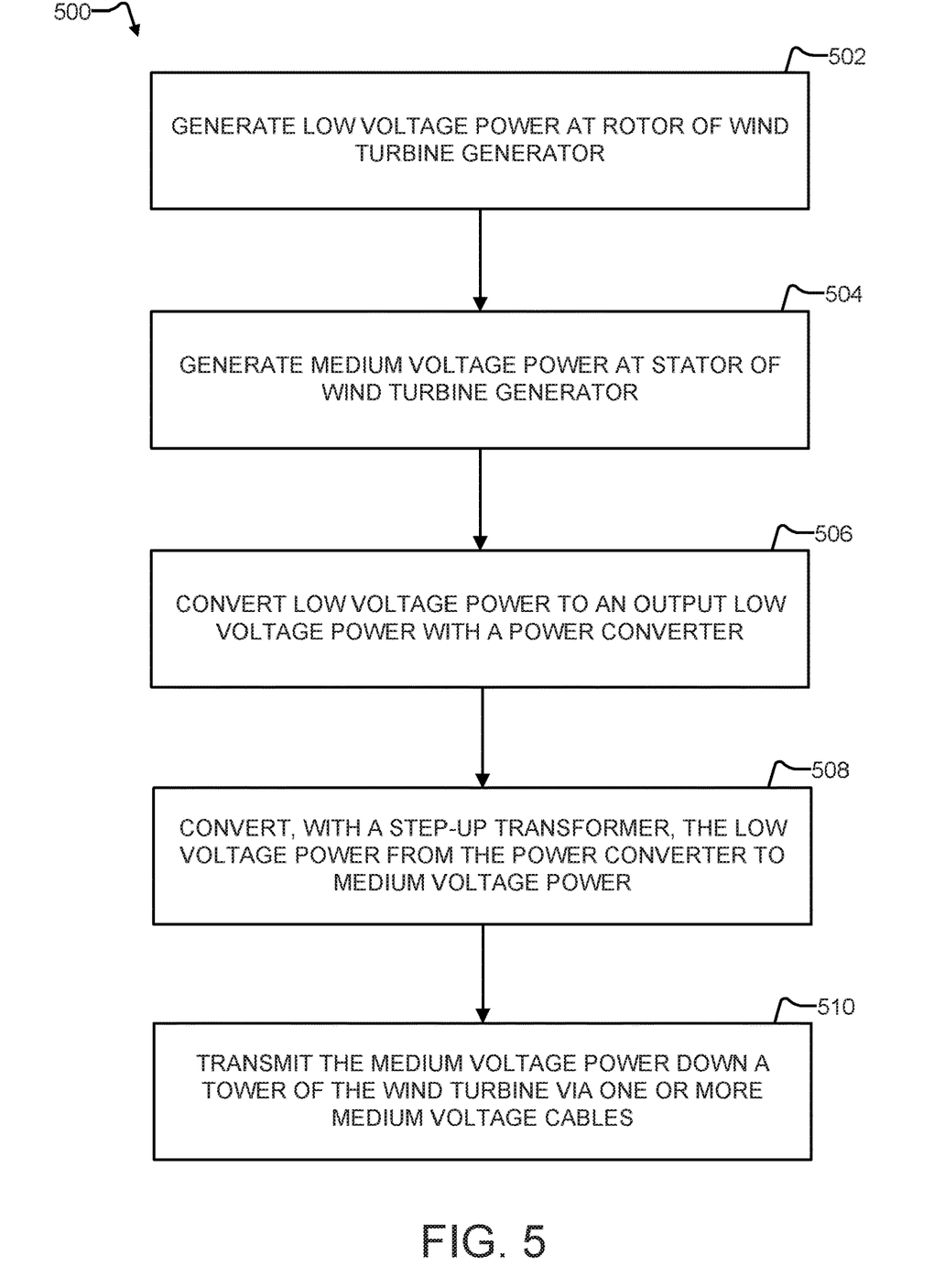
FIG. 5 illustrates a flow diagram of one embodiment of a method for controlling an uninterruptible power supply of an electrical power system according to the present disclosure; and, FIG. 6 illustrates an example electrical power system, according to one embodiment of the present disclosure.

FIG. 5 illustrates a flow diagram of one embodiment of a method 500 for distributing power in a wind turbine power system. The method 500 can include generating low voltage power at a rotor 122 of a wind turbine generator 120, at block 502. Generally, the low voltage power is less than about 1 kilovolt.

The method 500 can also include generating medium voltage power at a stator 124 of the wind turbine generator 120, at block 504. Generally, the medium voltage power is between about 1 and 13.8 kilovolts.

The method 500 can also include converting, with power converter 162, the low voltage power to an output low voltage AC power, at block 506. For example, the DC link 136 created in the power converter may be used to power the controller 174 and other aspects of the wind turbine, including rotation of the nacelle portion 16, pitch of associated blades, and other similar aspects.

The method 500 further includes converting, with step-up transformer 192, the low voltage power from the power converter 162 to medium voltage power, at block 508. For example, the step-up transformer 192 (also referred to as a line transformer), can step-up the voltage from under 1 kilovolts to between about 1 and 13.8 kilovolts.

The method 500 also includes transmitting, the medium voltage power, down a tower 12 of the wind turbine generator via one or more medium voltage cables 159, at block 510. The transmitted medium voltage power includes combined medium voltage power from both the stator 124 and the stepped up voltage from the step-up transformer 192.

As described above, a line transformer may be use to step-up low voltage from a power converter to medium voltage for transmission through a tower portion of a wind turbine system. However, although described as having a main transformer arranged within a down tower or base portion of a wind turbine system, the same may be varied in many ways. For example and referring now to FIG. 6, a wind turbine electrical power system 600 is illustrated.

Figure 6:
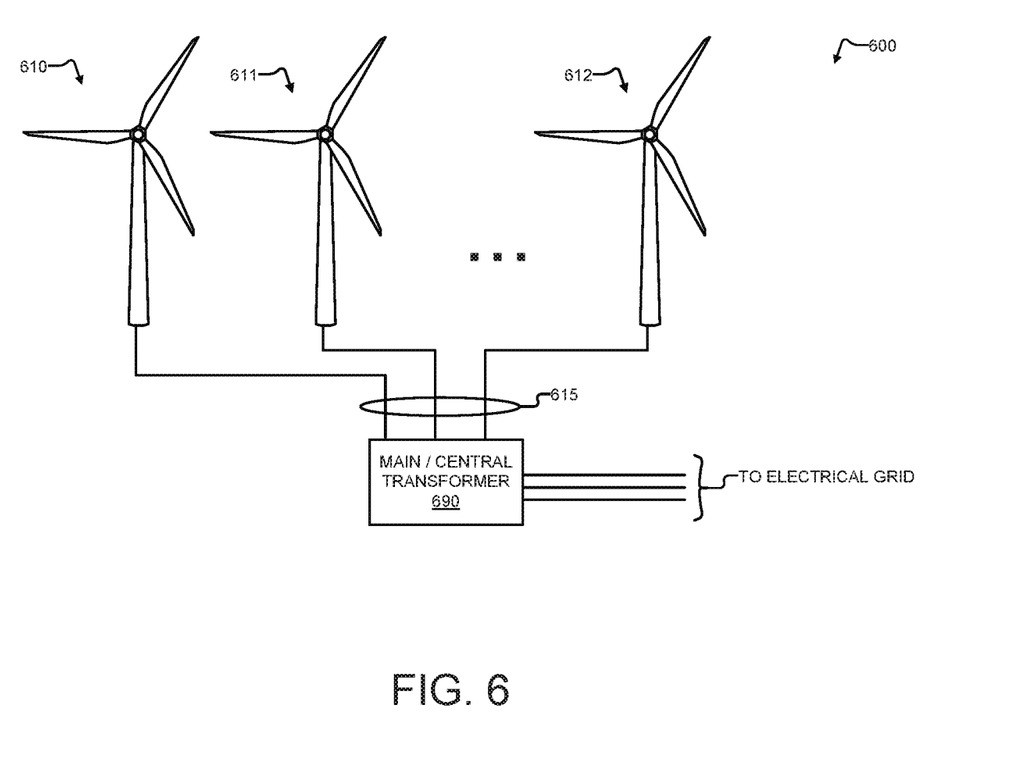

The system 600 can include a main or central transformer 690 configured to transform medium voltage power to high voltage power for an electrical grid. The system 600 can also include a plurality of wind turbines 610, 611, 612 in operative communication with the central transformer 690 over one or more medium voltage cables 615. Each wind turbine of the plurality of wind turbines 610, 611, 612 may be substantially similar to the individual wind turbine 10 and include a wind turbine DFIG system 100 arranged therein.

Accordingly, each of the wind turbines 610, 611, 612 can include a tower portion having one or more medium voltage cables 615 configured to transmit medium voltage power, and, a nacelle portion having a generator. The generator can include a stator and a rotor, with the stator connected to one or more medium voltage cables via a stator power path. The nacelle portion can also include a power converter coupled to the rotor of the generator, and, a step-up transformer coupled to the power converter and the one or more medium voltage cables. The step-up transformer can be configured to step-up low voltage power received at the power converter from the rotor to medium voltage power for transmission via the one or more medium voltage cables 615.

Example embodiments of a wind turbine, a control system for a wind turbine, and methods of controlling a wind turbine are described above in detail. The methods, wind turbine, and control system are not limited to the specific embodiments described herein, but rather, components of the wind turbine and/or the control system and/or steps of the methods may be utilized independently and separately from other components and/or steps described herein. For example, the control system and methods may also be used in combination with other wind turbine power systems and methods, and are not limited to practice with only the power system as described herein. Rather, the exemplary embodiment can be implemented and utilized in connection with many other wind turbine or power system applications, such as solar power systems and energy storage systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine system coupled to an electrical grid, comprising:
   a down tower portion comprising a main transformer configured to transform medium voltage power to another voltage power;
   a tower portion comprising one or more medium voltage cables configured to transmit medium voltage power; and,
   a nacelle portion comprising:
      a generator comprising a stator and a rotor, the stator connected to one or more medium voltage cables via a stator power path;
      a generator breaker arranged between the generator and the electrical grid in the stator power path;
      a power converter coupled to the rotor of the generator and defining a converter power path; and,
      a step-up transformer coupled to the power converter in the converter power path and the one or more medium voltage cables, the step-up transformer configured to step-up low voltage power received at the power converter from the rotor to medium voltage power for transmission via the one or more medium voltage cables,
      wherein the generator, the power converter, and the step-up transformer are housed uptower within the nacelle portion, and
      wherein the stator power path and the converter power path are connected to windings of the main transformer at a junction of the generator breaker and the step-up transformer.

2. The wind turbine system of claim 1, wherein the step-up transformer is a cast resin transformer with integrated cooling.

3. The wind turbine system of claim 1, wherein the nacelle further comprises a liquid-to-air heat exchanger and liquid path, wherein the liquid path is configured to cool at least one of the generator, the power converter, the step-up transformer, and a gearbox or drivetrain.

4. The wind turbine system of claim 1, wherein the step-up transformer is configured to step-up low voltage received at the power converter to between about 1 and 13.8 kilovolts.

5. The wind turbine system of claim 1, wherein the nacelle further comprises:
a control system comprising one or more control devices, the one or more control devices configured to operate the power converter.

6. The wind turbine system of claim 1, wherein the power converter comprises:
a line-side converter coupled to the set of medium voltage cables via a converter power path; and,
a rotor-side converter coupled to a rotor bus of the rotor and the line-side converter via a DC link.

7. The wind turbine system of claim 1, wherein the main transformer is configured to transform voltage received from the set of medium voltage cables to high voltage.

8. The wind turbine system of claim 7, wherein the high voltage is about 33 kilovolts.

9. The wind turbine system of claim 1, wherein medium voltage is between about 1 to 13.8 kilovolts and high voltage is about 33 kilovolts.

10. A method for distributing power in a wind turbine power system, comprising:
generating low voltage power at a rotor of a generator of the wind turbine power system;
generating medium voltage power at a stator of the generator, the stator connected to one or more medium voltage cables via a stator power path;
converting, with a power converter in a nacelle portion of the wind turbine power system, the low voltage power to an output low voltage AC power, the power converter coupled to the rotor of the generator and defining a converter power path;
converting, with a step-up transformer in the nacelle portion of the wind turbine power system, the output low voltage AC power from the power converter to medium voltage power, the step-up transformer coupled to the power converter in the converter power path and the one or more medium voltage cables; and,
transmitting the medium voltage power down a tower of the wind turbine power system via the one or more medium voltage cables and to a main transformer,
wherein the stator power path and the converter power path power converter are connected to windings of the main transformer at a junction of a generator breaker of the wind turbine power system and the step-up transformer, the generator breaker arranged between the generator and the electrical grid in the stator power path.

11. The method of claim 10, wherein the step-up transformer is a cast resin transformer with integrated cooling.

12. The method of claim 10, wherein the step-up transformer is configured to step-up low voltage received at the power converter to between about 6 and 12 kilovolts.

13. The method of claim 10, wherein medium voltage is between about 1 to 13.8 kilovolts and high voltage is about 33 kilovolts.

14. A wind turbine electrical power system coupled to an electrical grid, comprising:
a central transformer configured to transform medium voltage power to another voltage power; and,
a plurality of wind turbines in operative communication with the central transformer, each wind turbine of the plurality of wind turbines comprising:
a tower portion comprising one or more medium voltage cables configured to transmit medium voltage power; and,
a nacelle portion comprising:
a generator comprising a stator and a rotor, the stator connected to one or more medium voltage cables via a stator power path;
a generator breaker arranged between the generator and the electrical grid in the stator power path;
a power converter coupled to the rotor of the generator and defining a converter power path; and,
a step-up transformer coupled to the power converter in the converter power path and the one or more medium voltage cables, the step-up transformer configured to step-up low voltage power received at the power converter from the rotor to medium voltage power for transmission via the one or more medium voltage cables,
wherein the generator, the power converter, and the step-up transformer are housed uptower within the nacelle portion, and
wherein the stator power path and the converter power path are connected to windings of the central transformer at a junction of the generator breaker and the step-up transformer.

15. The wind turbine electrical power system of claim 14, wherein each step-up transformer is a cast resin transformer with integrated cooling.

16. The wind turbine electrical power system of claim 14, wherein each nacelle further comprises a liquid-to-air heat exchanger and liquid path, wherein the liquid path is configured to cool at least one of the generator, the power converter, the step-up transformer, and a gearbox or drivetrain.

17. The wind turbine electrical power system of claim 14, wherein each step-up transformer is configured to step-up low voltage received at the power converter to between about 1 and 13.8 kilovolts.

18. The wind turbine electrical power system of claim 14, wherein the central transformer is configured to transform voltage received from the one or more medium voltage cables of each wind turbine to about 33 kilovolts.

19. The wind turbine electrical power system of claim 14, wherein medium voltage is between about 1 to 13.8 kilovolts and high voltage is about 33 kilovolts.

* * * * *